Patented Apr. 25, 1933

1,905,173

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

METHOD OF REFINING ROSIN

No Drawing. Application filed January 20, 1930. Serial No. 422,229.

My invention relates to a method of refining rosin such as wood rosin and gum rosin, and more particularly relates to removal from wood or gum rosin of color bodies.

As is well known, both wood and gum rosin contain color bodies which render the rosin undesirable for use in connection with the production of various products where a light colored product is desired. Gum rosin, which, as is well known, is obtained from living pine trees, may contain color bodies which give to the rosin and products in which it may be used a more or less dark color, and wood rosin, which, as is well known, is obtained, for example by the extraction of stump wood with a suitable solvent after removal of pine oil and turpentine by distillation, contains color bodies which are observable as in the case of gum rosin, and also certain color bodies which are not observable in the rosin as such but which darken, for example, where the rosin is subjected to oxygen, as present in the air, in the presence of an alkali, as where the rosin is used for the production of soap. The non-observable or latent color bodies present in wood rosin are also to an extent found in certain low grades of gum rosin.

The color bodies present in both wood and gum rosin and the latent color bodies present in wood rosin and low grades of gum rosin are deleterious, as has been indicated, since they act to darken products in which the rosin may be used, as soaps, varnishes, sizes, and the like. Heretofore the observable color bodies have been, to a substantial degree, removed from both wood and gum rosin. However, except by the practice of certain processes, the removal of latent color bodies from wood rosin and, where present, from gum rosin, has not been effected, with the result that wood rosin and gum rosin containing such latent color bodies have been unusable in connection with the production of products where lightness of color is essential, and especially where such products involve an alkali in addition to rosin, since, as has been indicated, the latent color bodies will darken when subjected to oxygen in the present of an alkali.

Now, it is the object of my invention to provide a process for the refining of rosin by the removal of color bodies therefrom, both observable and latent, with the production of a rosin light in color and, in the case of wood rosin and gum rosin containing latent color bodies, substantially free from color bodies and available for use in the production of products of light color, such as soaps, limed varnishes, sizes, etc.

In accordance with my invention I effect the removal from rosin of observable color bodies, and, to a substantial degree, the removal of latent color bodies where present, by treatment of the rosin with an ether having a capacity for selectively dissolving color bodies of the rosin, and having a capacity for substantial immiscibility with a suitable solvent for the rosin. In carrying out the process in accordance with my invention, I may use, for example, a substituted ether which contains certain atoms or groups of atoms which promote substantial immiscibility of the ether with suitable rosin solvents, such, for example, as a $CH_2OH$, $Cl$, $OH$, $NH_2$, $COH$, $OCH_3$, $NO_2$, $COOH$, etc. group for example, ethers containing the indicated groups are indicated by the following structural formulæ:

Group—COH —e. g.—Methoxybenzaldehyde $C_6H_4(COH)$—O—$CH_3$
Group—OH —e. g.—Guaiacol $C_6H_4(OH)$—O—$CH_3$
Group—$NH_2$ —e. g.—Anisidin $C_6H_4(NH_2)$—O—$CH_3$
Group—$NO_2$ —e. g.—Nitroanisole $C_6H_4(NO_2)$—O—$CH_3$
Group—Cl —e. g.—Dichlorcethyl ether $CH_2(Cl)$—O—$CH_2(Cl)$
Group—COOH —e. g.—Methoxyacetic acid $CH_2(COOH)$—O—$CH_3$
Group—$CH_2OH$—e. g.—Methoxybenzyl alcohol $C_6H_4(CH_2OH)$—O—$CH_3$.

In carrying the method in accordance with my invention into practice, the rosin to be refined is desirably dissolved in a suitable rosin solvent, such as gasoline, petroleum ether or other light petroleum distillate, turpentine, dipentene, pinene, or the like. The rosin, in solution, is treated with an ether, having a capacity for substantial immiscibility with the rosin solvent used, for example, by agitation of the ether, as such, or rendered liquid by heat, or in solution in a suitable solvent, as for example, glycol, glycerol, or other solvent for the ether which is capable of immiscibility with the solvent for the rosin, with the rosin solution to effect thorough contact between the ether and the rosin in solution, and to enable the ether to selectively dissolve color bodies of the rosin. In certain cases the ether and gasoline-rosin solution may be refluxed to obtain desired contact. After the ether has been thoroughly contacted with the rosin in solution, the mixture formed by the agitation is permitted to separate into layers or separation facilitated or induced through temperature control, as by cooling or refrigerating. The mixture then settles or may be caused to settle into two layers—one of which will contain ether, dissolved color bodies and some rosin, and the other of which will contain the rosin solvent, refined rosin and some color bodies. After settlement, the rosin is recovered from the rosin solution by, for example, evaporation off of the solvent.

In carrying out the method in accordance with my invention, I may use as the ether, for example, ethylene glycol monomethyl ether, guaiacol, resorcinol monomethyl ether, eugenol, o-anisidine, vanillin, hydro-quinone monomethyl ether, 3-chloropropylene oxide, 1-3 dichloropropylene oxide, glycerol dimethyl ether, resorcinol dimethyl ether, para methyoxybenzaldehyde, piperonal, p-phenetidin, veratrole, pyro-gallol trimethyl ether, chloroethylene oxide, dichloroethyl ether, methyl furfuryl ether, benzyl furfuryl ether, methoxy acetic acid, anisic acid, methoxy aceto phenone, methoxy benzyl alcohol, methoxy quinoline, methyl anisate, phenacetin, 5-nitro-2-amino anisole, O-nitro anisole, phenoxyacetic acid, glycerol phenyl ether, resorcinol dimethyl ether, p-anisidin, B,B-dihydroxy ethyl ether, m-anisidin, eugenol monomethyl ether, etc.

As illustrative of the practical adaptation of the method in accordance with my invention, for example, to 700 parts of gasoline wood rosin solution, containing, for example, 14% rosin in gasoline there is added 200 parts of ethylene glycol monomethyl ether. The mixture is thoroughly agitated, to contact the ethylene glycol monomethyl ether with the rosin in solution in the gasoline, and the mixture then permitted to settle into layers, the separation being desirably effected at a temperature of about 15° F. When the mixture has settled, the lower layer will comprise mainly ethylene glycol monomethyl ether and color bodies dissolved thereby from the rosin, and the upper layer, amounting to about 515 parts, will be substantially rosin in solution in gasoline. The gasoline-rosin solution being drawn off and the gasoline evaporated, a yield of about 63 parts of refined rosin, grading H in color, will be obtained.

As a further illustration, 47 parts of hydroquinone monomethyl ether are refluxed with 200 parts of the gasoline-rosin solution. The crystalline ether with refluxing will liquefy and color bodies of the rosin will be separated from the gasoline-rosin solution by decantation of the latter before cooling. A yield of 17 parts of K rosin will be recovered from the separated gasoline-rosin solution on evaporation of the gasoline.

As a further illustration, for example, 500 parts of gasoline-rosin solution are shaken with 100 parts of 3-chloro-propylene oxide, then cooled to −15° C. and permitted to separate into layers. The upper layer comprising gasoline-rosin solution, will yield 54 parts of refined rosin, grading H, on separation from the lower layer, comprising ether and dissolved color bodies, and evaporation of the gasoline.

As a further illustration, for example, 100 parts of para-methoxy-benzaldehyde are agitated with 500 parts of gasoline-rosin solution, cooled and separated at about 8° C. The gasoline layer will yield 52 parts of rosin grading M.

As a further illustration, for example, 250 parts of gasoline-rosin solution, which may involve either wood or gum rosin, is agitated with 73 parts of guaiacol to contact the guaiacal with the rosin in solution. After sufficient agitation the mixture is permitted to separate into layers, the separation being desirably effected at about 25° F. The mixture will settle into two layers, the lower one of which will comprise mainly guaiacol and color bodies of the rosin dissolved therein and the upper layer, amounting to about 220 parts, will comprise mainly gasoline-rosin solution from which about 25 parts of refined rosin, grading N, will be recovered on evaporation of the gasoline.

As a further illustration, say 300 parts of gasoline-rosin solution are agitated with about 25 parts of resorcinol monomethyl ether, the mixture being separated into two layers at a temperature of about 5° F. The upper layer, comprising mainly gasoline-rosin solution, will yield about 33 parts of refined rosin, grading H, on evaporation of the gasoline. Again, 500 parts of gasoline-rosin solution, agitated with 100 parts of o-anisidine and separated into layers at a temperature of about 10° F., will provide an upper layer comprising mainly rosin-gasoline solution which, on evaporation of the gasoline, will yield about 45 parts of refined rosin, grading H in color.

In carrying the method in accordance with my invention into practice, various solvents for the rosin may be used, it being required only that the solvent have greater solvent action on the rosin than on its color bodies and that it have a capacity for immiscibility with the ether used and it being understood that the solvent for the rosin acts merely as a carrier therefor in order that the ether used may be intimately contacted therewith.

As illustrative of the practical carrying out of the method in accordance with my invention, using a solvent other than gasoline, for example, 30 parts of wood rosin dissolved in 100 parts of alpha-pinene agitated with 65 parts of o-anisidine and, separated at about 10° F., will yield an upper layer of gasoline-rosin solution from which, on evaporation of the solvent, about 21 parts of refined rosin grading G will be recovered.

As illustrative of the practical carrying out of the method in accordance with my invention with the use, for example, of benzyl furfuryl ether, for example, 75 parts of furfuryl benzyl ether are dissolved in 100 parts of a 14% solution of rosin and gasoline at room temperature. The solution is then cooled to a temperature of say about −35° C. and permitted to settle. On settlement an upper layer of rosin in solution in gasoline will be obtained, which on separation from the lower layer comprising mainly furfuryl benzyl ether and dissolved color bodies, will yield about 7 g. of refined rosin, grading G in color.

As a further illustration, using para-phenetidine, for example, 100 parts of a 14% solution of rosin in gasoline is agitated with 30 parts of para-phenetidine at room temperature and the mixture permitted to settle at a temperature of about −5° C. The mixture will settle into two layers, the upper layer comprising gasoline and the lower layer comprising para-phenetidine and dissolved color bodies. The upper layer is separated from the lower layer and desirably washed with 5% sulphuric acid in order to effect removal of residual para-phenetidine, after which it is given a water wash to remove the acid. On evaporation of the gasoline, about 5 parts of refined rosin grading H in color will be obtained.

Alternatively, rosin may be refined by crystallizing it from a substituted ether, which is liquid at normal temperatures, as, for example, ethylene glycol monomethyl ether, or extracting its solution by a solution of a substituted ether, as for example, a solution of phenoxyacetic acid in glycol, and separating the rosin solution from the ether solution. Under such procedure the color bodies will remain in solution in the ether, or ether solution, and hence the recovered rosin will be in a refined state.

As illustrative of the procedure involving the treatment of rosin, as such, with, for example, a substituted ether, for example, 150 g. of wood rosin is dissolved by heating to about 125° C. in 50 g. of ethylene glycol monomethyl ether. On cooling the solution to about +20° C. about 58 g. of rosin will crystallize out in a refined state, leaving the balance of the original rosin, together with color bodies, in solution in the ether.

It will be appreciated that I do not intend that my invention shall be limited to the use of any particular solvent, nor to those various solvents particularly mentioned, as it will be understood that I contemplate as within the scope of my invention the use of any equivalent solvent.

In carrying out the method in accordance with my invention where the ether selected is liquid at normal temperatures, the procedure will be obvious. On the other hand, where the ether selected is solid, or substantially solid, at normal temperatures, it will be understood that in utilization of the ether it will be liquefied either by the application of heat, or by dissolving it in a solvent substance as, for example, glycol or glycerin, or the like, which will have itself a capacity for immiscibility with such solvent as is used for dissolving the rosin where the rosin is treated in solution.

It will be noted that in accordance with my invention I contemplate the use of an ether having a capacity for selectively dissolving color bodies in the rosin which is normally substantially immiscible with such solvent as is used for dissolving the rosin where the rosin is treated in solution, and also ethers which may be rendered immiscible with such solvent either by control of temperature, as by reduction of temperature, or by admixture with some substance itself substantially immiscible with the solvent for the rosin and capable of rendering the ether substantially immiscible therewith, such as glycol, glycerin, or the like It will now be noted that the method in accordance with my invention involves, from the broad standpoint, the refining of rosin by the removal of color bodies, observable and/or latent, therefrom, by treatment of the rosin with an ether which has a capacity for selectively dissolving color bodies in the rosin, and more particularly by the treatment of rosin in solution in a solvent therefor with an ether having, in addition to a capacity for selectively dissolving color bodies in the rosin, a capacity for immiscibility with the solvent for the rosin used, in order that the ether, together with the color bodies dissolved thereby, may be separated from the rosin-solvent solution.

What I claim and desire to protect by Letters Patent is:

1. The method of refining rosin by the removal of color bodies therefrom which includes subjecting rosin in solution in a solvent therefor to treatment with an ether, having a capacity for selectively dissolving color bodies in the rosin and which is capable of immiscibility with the solvent for the rosin, separating the ether and color bodies dissolved thereby from the rosin-solvent solution and recovering refined rosin from the rosin-solvent solution.

2. The method of refining rosin by the removal of color bodies therefrom which includes subjecting rosin in solution in gasoline to treatment with an ether, having a capacity for selectively dissolving color bodies in the rosin and which is capable of immiscibility with gasoline, separating the ether and color bodies dissolved thereby from the rosin-gasoline solution and recovering refined rosin from the rosin-gasoline solution.

3. The method of refining rosin by the removal of color bodies therefrom which includes subjecting rosin in solution in a solvent therefor to treatment with a substituted ether, having a capacity for selectively dissolving color bodies in the rosin and which is capable of immiscibility with the solvent for the rosin, separating the ether and color bodies dissolved thereby from the rosin-solvent solution and recovering refined rosin from the rosin-solvent solution.

4. The method of refining rosin by the removal of color bodies therefrom which includes subjecting rosin in solution in gasoline to treatment with a substituted ether, having a capacity for selectively dissolving color bodies in the rosin and which is capable of immiscibility with gasoline, separating the ether and color bodies dissolved thereby from the rosin-gasoline solution and recovering refined rosin from the rosin-gasoline solution.

5. The method of refining rosin by the removal of color bodies therefrom which includes subjecting rosin in solution in gasoline to treatment with a substituted aromatic ether, having a capacity for selectively dissolving color bodies in the rosin and which is capable of immiscibility with gasoline, separating the ether and color bodies dissolved thereby from the rosin-gasoline solution and recovering refined rosin from the rosin-gasoline solution.

6. The step in the method of refining rosin by the removal of color bodies therefrom which includes subjecting rosin to treatment with a substituted ether having a capacity for selectively dissolving color bodies in the rosin.

7. The step in the method of refining rosin by the removal of color bodies therefrom which includes subjecting rosin in a solvent therefor to treatment with a substituted ether containing a group which will promote immiscibility of the ether with a solvent for the rosin.

8. The step in the method of refining rosin by the removal of color bodies therefrom which includes subjecting rosin to treatment with an ether containing a free hydroxyl group.

9. The step in the method of refining rosin by the removal of color bodies therefrom which includes subjecting rosin in solution in a suitable solvent therefor to treatment with an ether containing a free hydroxyl group.

10. The step in the method of refining rosin by the removal of color bodies therefrom which includes subjecting rosin to treatment with an ether containing one of the groups COH, OH, $NH_2$, $NO_2$, Cl, $OCH_3$.

11. The step in the method of refining rosin by the removal of color bodies therefrom which includes subjecting rosin to treatment with guaiacol.

12. The method of refining rosin by the removal of color bodies therefrom which includes subjecting rosin in solution in a solvent therefor to treatment with guaiacol, separating guaiacol and color bodies dissolved thereby from the rosin-solvent solution and recovering refined rosin from the rosin-solvent solution.

13. The method of refining rosin by the removal of color bodies therefrom which includes subjecting rosin in solution in gasoline to treatment with guaiacol, separating guaiacol and color bodies dissolved thereby from the rosin-gasoline solution and recovering refined rosin from the rosin-gasoline solution.

14. The method of refining rosin by the removal of color bodies therefrom which includes subjecting rosin in solution in a solvent therefor to treatment with an ether, having a capacity for selectively dissolving color bodies from the rosin in solution in a solvent therefor which is capable of substantial immiscibility with the solvent for the rosin, separating the ether and solvent therefor from the rosin-solvent solution and recovering refined rosin from the rosin-solvent solution.

15. The method of refining rosin by the removal of color bodies therefrom which includes subjecting rosin in solution in a solvent therefor to treatment with an ether, having a capacity for selectively dissolving color bodies in the rosin, in solution in glycol, separating the ether-glycol solution from the rosin-solvent solution and recovering refined rosin from the rosin-solvent solution.

16. The method of refining rosin by the removal of color bodies therefrom which includes subjecting rosin in solution in a solvent therefor to treatment with an ether, having a capacity for selectively dissolving color bodies in the rosin, in solution in glycol, separating the ether-glycol solution from the rosin-solvent solution and recovering refined rosin from the rosin-solvent solution.

17. The step in the method of refining rosin by the removal of color bodies therefrom which includes subjecting rosin in solution in a suitable solvent therefor to treatment with an ether containing a cyclic group.

18. The step in the method of refining rosin by the removal of color bodies therefrom which includes subjecting rosin in solution in a suitable solvent therefor to treatment with a substituted ether.

19. The step in the method of refining rosin by the removal of color bodies therefrom which includes subjecting rosin to treatment with a chloro-ether having a capacity for selectively dissolving color bodies in the rosin.

20. The step in the method of refining rosin by the removal of color bodies therefrom which includes subjecting rosin in solution in a suitable solvent therefor to treatment with a chloro-ether having a capacity for selectively dissolving color bodies in the rosin.

21. The step in the method of refining rosin by the removal of color bodies therefrom which includes subjecting rosin to treatment with an ether containing an aldehyde group and having a capacity for selectively dissolving color bodies in the rosin.

22. The step in the method of refining rosin by the removal of color bodies therefrom which includes subjecting rosin in solution in a suitable solvent therefor to treatment with an ether containing an aldehyde group and having a capacity for selectively dissolving color bodies in the rosin.

In testimony of which invention, I have hereunto set my hand, at Kenvil, N. J., on this 7th day of January, 1930.

IRVIN W. HUMPHREY.